United States Patent

Roberts et al.

[15] 3,679,157
[45] July 25, 1972

[54] AIRCREW RECOVERY SYSTEM

[72] Inventors: Richard A. Roberts, Corona; John R. Jones, Palos Verdes Peninsula, both of Calif.

[73] Assignee: The United States of America as represented by the Secretary of the Navy

[22] Filed: Oct. 16, 1970

[21] Appl. No.: 81,353

[52] U.S. Cl. ............................ 244/141, 244/122 A, 244/16, 244/154
[51] Int. Cl. ..................................................... B64d 25/10
[58] Field of Search ................ 244/138, 141, 122 R, 122 A, 244/144, 2, 16, 137 P, 153, 154

[56] References Cited

UNITED STATES PATENTS

| | | | |
|---|---|---|---|
| 3,372,893 | 3/1968 | Larsen et al. | 244/138 R |
| 3,362,665 | 1/1968 | Larsen et al. | 244/138 A |
| 1,874,237 | 8/1932 | Bruno | 244/122 A X |
| 3,042,347 | 7/1962 | Halsey | 244/141 |

FOREIGN PATENTS OR APPLICATIONS

| | | | |
|---|---|---|---|
| 814,599 | 3/1937 | France | 244/138 A |

*Primary Examiner*—Milton Buchler
*Assistant Examiner*—Carl A. Rutledge
*Attorney*—R. S. Sciascia and Henry Hansen

[57] ABSTRACT

A deployable assembly, combined with an ejection seat, which when deployed by a drogue chute forms a lifting platform controllable by the crew member in the ejection seat. The assembly is deployed after parent aircraft abort from a collapsed configuration behind the seat and includes two wing lifting surfaces, a tail boom carrying a deployable empennage and a damper unit for selective conversion of the drogue chute drag into relative deployment sequence of the boom, empennage and the wings.

16 Claims, 10 Drawing Figures

PATENTED JUL 25 1972 3,679,157

INVENTORS
RICHARD A. ROBERTS
BY JOHN R. JONES

Henry Hansen
ATTORNEY

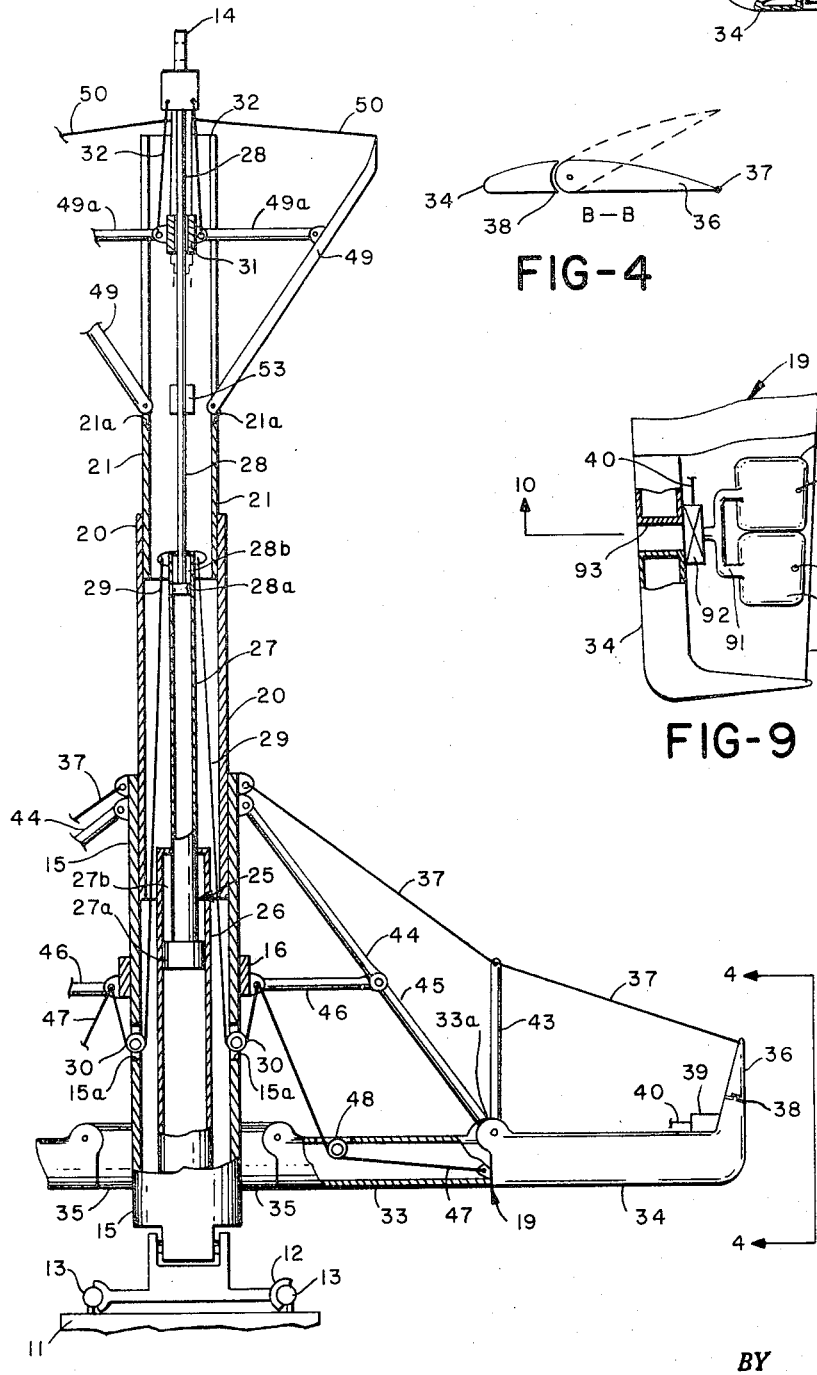

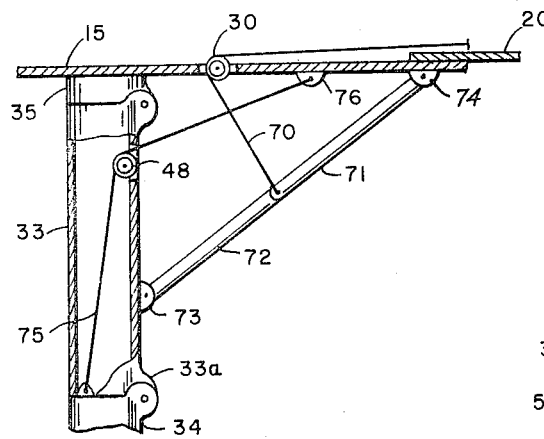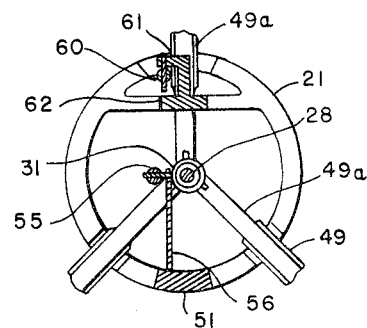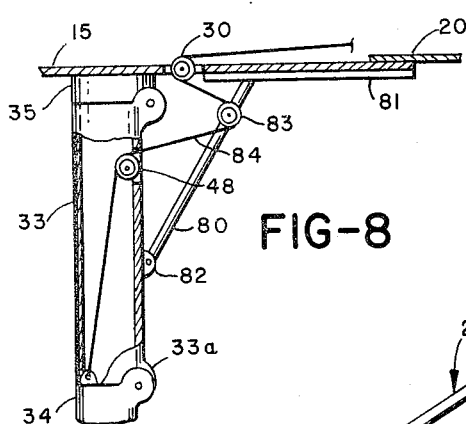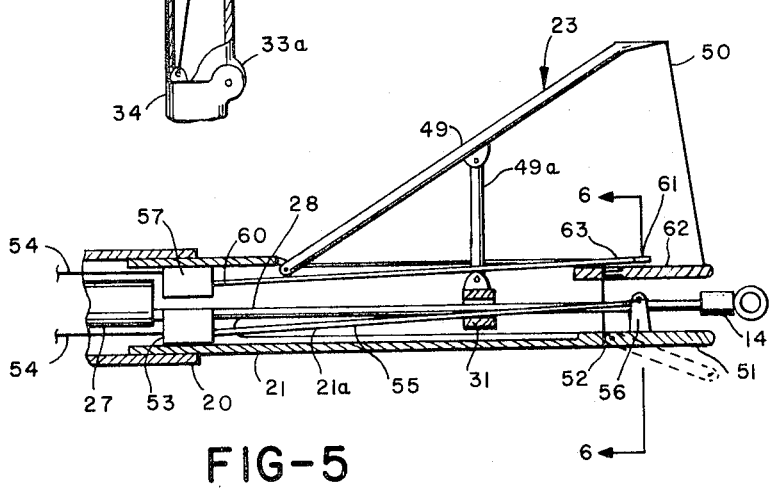

AIRCREW RECOVERY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to aircraft crew recovery systems, and more particularly to ejection seat systems which deploy a fly-away airframe upon aircraft abort.

As the experience in the Southeast Asian conflict has shown, the parachute-retarded aircraft crew ejection systems presently in use frequently constrain touchdown to hostile territory resulting in capture and loss of indispensable surviving crew. Even if now captured, recovery of downed air crew personnel is hindered by ground cover which obliterates their position reducing the likelihood of successful rescue. One of the primary causes of these deficiencies is the low range increment attendant with parachutes; that is, the inability of parachutes to be maneuvered long distances over land during their descent.

Various techniques and systems such as deployable autogyros and paragliders have been proposed in combination with ejection seats to increase their range increment and maneuverability in order that the crew personnel have a larger option of touchdown locations. The autogyro demands a high level of pilot proficiency not easily developed in all of the crew members, and paragliders are limited in either range increment or minimum collapsed size. Generally these and other limitations arise from the conflicting requirements of a lightly loaded paraglider wing or autogyro disc areas in combination with a low induced drag. Particularly in the paraglider configurations, low induced characteristics connote slender planforms (wing outline as view from above), i.e., high aspect ratio planforms which, in combination with the area constraint, dictate large supporting structures. In addition the longitudinal stability characteristics of a slender wing alone are generally inadequate both during and after deployment.

SUMMARY OF THE INVENTION

Accordingly, it is a general purpose and object of this invention to provide increased range and maneuverability in an ejection seat package whereby the crew member is not constrained to touchdown in the immediate area of the emergency on aborting the aircraft.

Another object of the invention is to provide a novel and improved stable aerodynamic platform to which a power plant can be attached for conventional aircraft flight.

Yet another object of the invention is to provide a crew member with a flying platform which would require minimal piloting skills. The unique arrangement of the wing and empennage structure of the invention allows for exactly such minimal skill as opposed, for example, to autorotating lifting surfaces.

These and other objects of the invention are accomplished by a combination of an aircraft ejection seat, a pair of foldable high aspect ratio wings and a telescoping tail boom which on its outboard end deploys a three-surface empennage. All of the aerodynamic surfaces comprise of a structural skeleton over which a flexible covering is stretched. The skeleton and the tail boom collapse and the fabric folds up for convenient storage behind the ejection seat when not in use. The whole assembly is deployed by means of a drogue chute which, by its drag force, extends the telescopic tail boom and at the same time through an arrangement of pulleys, braces and collars erects the aerodynamic surfaces. The invention at the same time provides a damper arrangement which, permits the proper sequencing of the wing and the empennage surface deployment by converting the telescoping of the boom into relative motion with respect to the wings and the empennage. In its ordinary use the invention is a safety backup device collapsed for convenient storage in the confines of the crew compartment along and behind the backrest of the ejection seat and attached to the seat as a package.

BRIEF DESCRIPTION OF THE DRAWINGS

FIG. 3 is a top view partially in cross section, of the embodiment of FIG. 2, only the left wing and horizontal stabilizer being shown;

FIG. 4 is an end view of the left wing;

FIG. 5 is a side view, partially in cross section, of the vertical stabilizer of the embodiment of FIG. 2;

FIG. 6 is a cross-sectional view of a portion of the vertical stabilizer taken along the line 6—6 of FIG. 5;

FIG. 7 is a top view of a portion of the left wing illustrating another embodiment of the invention for wing deployment;

FIG. 8 is a top view of a portion of the left wing illustrating yet another embodiment of the invention for wing deployment;

FIG. 9 is a top view of a portion of the left wing illustrating another embodiment of the invention for surface control; and FIG. 10 is a cross-sectional view of the wing taken along the line 10—10 of FIG. 9.

DESCRIPTION OF THE PREFERRED EMBODIMENTS

Figure 1:
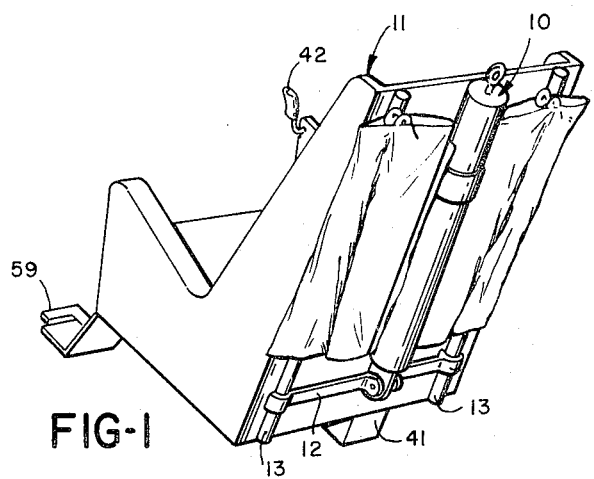
FIG. 1 is an isometric rear view of one preferred embodiment of the invention including aerodynamic surfaces and telescoping boom collapsed along the back of an ejection seat.

Referring now to the embodiment of FIG. 1 where the invention is illustrated in the collapsed state, a deployable assembly 10 is carried along the outside surface of the backrest of an ejection seat 11 and is pivoted at one end from a pivot carrier 12 which is slidably constrained by the outside surfaces of two ejection tubes 13 to move along the longitudinal axis of the backrest. Carrier 12 as shown in FIG. 1 is positioned adjacent to the bottom edge of the backrest and folded upward against the backrest with the other end adjacent to the top of the backrest.

Figure 2:
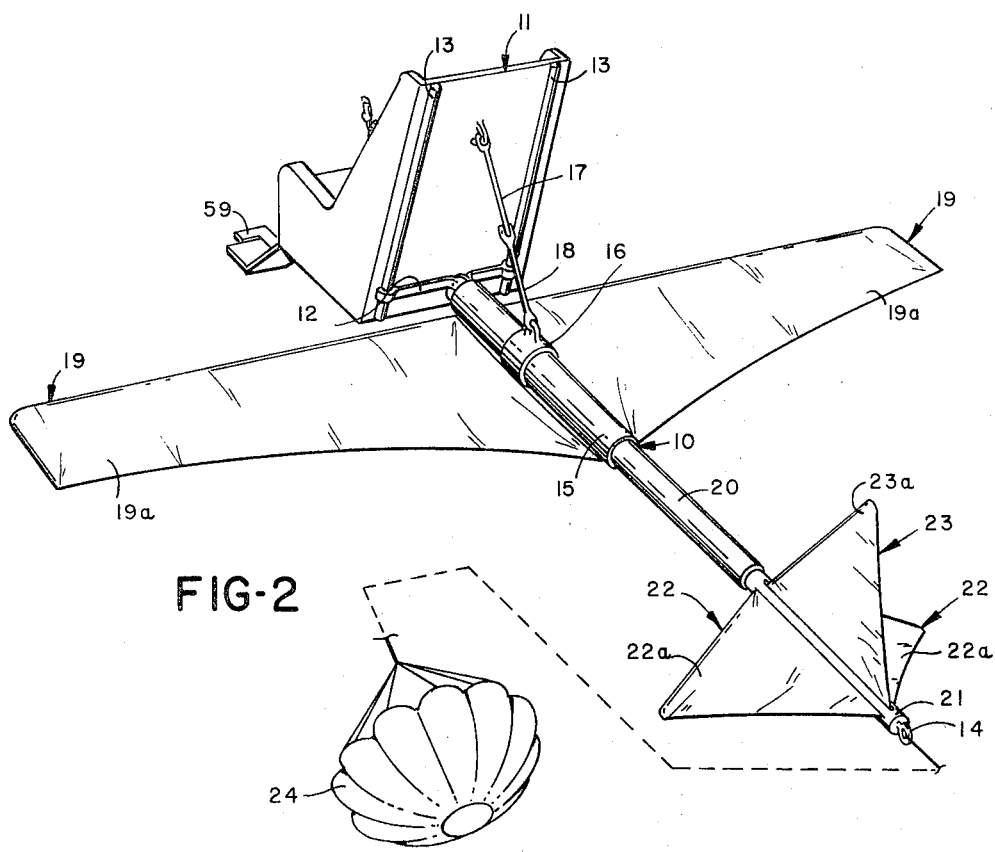
FIG. 2 is an isometric rear view of the embodiment of FIG. 1 employed in a flyable configuration.

Referring further to FIG. 2, where the invention is fully deployed, carrier 12 is displaced upwardly from the bottom edge of the backrest. Assembly 10 includes an outside tube 15 pivoted at the forward end from the carrier 12. Intermediate the ends of tube 15 and slidable along its length is a collar 16 end to the upper end of the backrest by two serially connected brace members 17 and 18. The brace members 17 and 18 are of substantially equal length and are pivotally connected to enable them to scissor inwardly toward the carrier 12 and slide collar 16 afterward from the forward most position shown. Right and left wings 19 laterally extend from either side of tube 15 in a manner described hereinbelow. A center tube 20 slidably telescopes from the aft end of tube 15 and an inside tube 21, in turn, slidably telescopes from the aft end of tube 20. Right and left horizontal stabilizers 22 laterally extend from either side of tube 21 and a vertical stabilizer 23 extends upwardly therefrom. A fitting 14 for attachment of a drogue chute 24 protrudes from the extreme outboard end of the tube 21.

The elements of deployment of assembly 10 are more specifically illustrated in FIG. 3. A concentric dual damper unit 25 is located inside the cavity of telescoping tubes 15, 20 and 21 includes an outer damper tube 26, attached by its forward closed end to the forward end of tube 15. A center damper tube 27 telescopes out of the aft end of outer damper tube 26. Also a damper rod 28 telescopes out of the aft end of tube 27. Orificed pistons 27a and 28a at the forward ends of tube 27 and rod 28, respectively, control the bleed rates of hydraulic fluids contained in the aft chambers 27b and 28b formed by tubes 27 and 27 and tube 27 and rod 28 respectively. The orifice sizes are determined in a manner described hereinbelow. A pair of cables 29 is attached to the aft end of tube 27 and is routed over the forward sides of pulleys 30 located adjacent to the forward end of tube 15, and through openings 15a to the outside of tube 15 to attach to collar 16. Damper rod 28 at its outboard end carries the drogue chute fitting 14. A collar 31, slidable along rod 28, is located intermediate the aft end of damper tube 27 and the fitting 14 and is connected thereto by cables 32 whose lengths are determined in a manner described hereinbelow.

Left wing 19 includes two serially pivoted inboard and outboard leading edge segments 33 and 34 respectively, the inboard segment 33 being pivoted at its aft side of the inboard end from a fitting 35 fixed proximate the forward end of tube 15. Fitting 35 is formed to limit the forward travel of segment 33. The outboard segment 34 is, in turn, pivoted at its aft side of its inboard end from the distal end of the inboard segment 33 at a fitting 33a which is formed on segments 33 to limit the forward travel of segment 34. Segment 34, at its distal end, is shaped into a wingtip comprising an aft pivoted section 36. A wire 37 is connected from the trailing edge of section 36 to proximate the aft end of tube 15 and determines the trailing edge of wing 19 when segments 33 and 34 are fully deployed. Attached to segments 33 and 34 and wire 37 are an upper and lower flexible covering 19a, which form smooth aerodynamic surfaces when wing 19 is fully deployed, and which fold with wing 19 when assembly 10 is collapsed.

As further illustrated in FIG. 4, roll control deflection of wing 19 trailing edge is facilitated by pivoting section 36 of the wingtip from a pivot 38 located intermediate the fore and aft ends of wingtip. A servo actuator 39, of the type commonly known to those skilled in the art, is attached to the aft side of segment 34 and converts by any mechanically expedient means an output 40 of a control unit 41, attached to bottom of seat 11, into pivotal displacement of section 36. Control unit 41, by conventional means known to those skilled in the art, generates an output signal on conductor 40 according to the lateral position of a control stick 42 located on the right armrest of seat 11. Wire 37, attached to the aft end of section 36, is accordingly displaced resulting in either an increase or decrease of lift generated by left wing 19 and, in combination with the right wing 19, produces a rolling moment. The alignment axis of pivot 38 approximately intersects the attachment point of wire 37 to tube 15 thereby reducing tension changes in wire 37 with control position.

A rib 43, attached to the pivot common to segment 33 and segment 34 at its forward end, is erected by a detent in segment 34 pin fitting and trails aft, attached to wire 37, when segment 34 is fully deployed, to support wire 37 and flexible coverings 19a and to add the necessary stiffness.

Segments 33 and 34 are deployed by scissoring out serially connected inboard and outboard brace members 44 and 45, respectively, which are pivoted at their distal ends from two fittings, one at the fitting 33a and the other proximate the aft end of tube 15. The scissoring is accomplished by a linkage 46 pivotally connected between collar 16 and the common pivot of members 44 and 45. The lengths of members 44 and 45 and linkage 46 are determined by the forward most position of collar 16 when segment 33 is fully extended. A cable 47 is attached at one end to collar 16, routed over the forward side of a pulley 48 mounted on segment 33 near fitting 35, and attached at the other end to the leading edge of segment 34 interface. The points of cable 47 attachment and pulley 48 locations in the deployed position shown determine the length of cable 47 necessary. It is contemplated that the right wing 19 is symmetrically constructed in the same manner.

The left horizontal stabilizer 22 includes a leading edge member 49 pivotally attached at its forward end intermediate the ends of tube 21, to the forward end of an equal number of longitudinal slots 21a for receiving member 49 when collapsed enabling tube 21 to slide into tube 20. Radially pivoted from the collar 31 is a brace member 49a, which extending through openings 21a at its other end pivotally attaches to member 49 approximately at the midpoint thereof. The distal end of member 49 is connected by a wire 50 to the aft end of the tube 21 which determines the trailing edge of stabilizer 22 when member 49 is fully employed. Attached to member 49 and wire 50 are upper and lower flexible coverings 22a which form smooth aerodynamic surfaces when stabilizer 22 is fully deployed, and which folds when stabilizer 22 is collapsed. Right horizontal stabilizer 22 and vertical stabilizer 23, not shown in this illustration, are deployed in a similar manner.

Control deflections of the horizontal stabilizer 22 surfaces are facilitated, as shown in FIG. 5, by pivoting an aft bottom section 51 of tube 21, to which, at its free end trailing edge wires 50 of both the right and left horizontal stabilizers 22 are attached. At the forward and section 51 is pivotally attached by a pivot 52 to the aft end of tube 21. A servo actuator 53 of a conventional type known to those skilled in the art is attached to the inside of tube 21 proximate and forward of pivot 52. Actuator 53 receives an output along conductor 54 from the control unit 41, according to the longitudinal displacement of the stick 42, which it converts to linear displacement of a pushrod 55. Pushrod 55 is attached pivotally at its distal end to a horn 56 and the horn at its bottom end, is, in turn, attached to section 51 resulting in pivotal articulation of section 51 together with the inboard ends of wires 50 of the right and left horizontal stabilizers 22. Vertical stabilizer 23 is articulated in a similar fashion. As shown in FIG. 5 and FIG. 6, an actuator 57 attached to the inside of tube 21 converts an output 58 of control unit 41 according to a displacement of two pedals 59 attached to seat 11 to a linear displacement of a pushrod 60. Pushrod 60 is pivotally connected to the free end of a horn 61 where the horn 61 laterally extends below a laterally pivoted section 62, section 62 at its aft end is attached to wire 50 of the vertical stabilizer 23 and at its forward end laterally pivots from a pivot 63 attached to tube 21.

Following ejection of the seat 11 and deployment of the drogue chute 24 by any well-known means in the art, a drag force is generated and transmitted through the drogue chute fitting 14 to the inner damper rod 28 which moves aftward placing cables 32 in tension. Collar 31 to which cables 32 are attached transfers the tension force to brace member 49a, collapsed at this time into its respective slots 21a, and pulls the tube 21 out by transmitting force through the leading edge member 49, also collapsed, until the leading edge member 49 is free of center tube 20 and can pivot. The damper rod 28 continues to move aftward out of the center tube 27 carrying with it the collar 31 and inboard end of brace member 49a, which, because of its pivotal attachment to the leading edge member 49, pivots out deploying the leading edge member 49 along with it. The orifice sizes of orifice pistons 27a and 28a are selected for the desired relative damping coefficients of center tube 27 and damper rod 28 to obtain proper sequencing in the deployment of the stabilizers 22, 23 and wings 19. It is contemplated that once deployed, assembly 10 will be locked in position by obvious mechanical expedients such as detents not shown and the drogue chute 24 will be jettisoned.

Alternate embodiments for wing employment are shown in FIGS. 7 and 8. In FIG. 7 a cable 70 attaches at one end to a common pivot of two inboard and outboard brace members 71 and 72 respectively and is routed over the forward end of pulley 30 aft to attach to the aft end of damper tube 27 at the other end. The distal ends of members 71 and 72 are respectively pivoted from a pivot 73 intermediate the ends of segment 33 and a pivot 74 attached to tube 15 intermediate pulley 30 and wire 37. A second cable 75 is attached at one end to a fitting 76 on tube 15 and is routed over the forward side of pulley 48 to attach at the other end to the leading edge of segment 34 interface. Segment 33 is deployed by cable 70 which pulls the common pivot of members 71 and 72 forward scissoring open these members until they are approximately colinear. The deployment of segment 34 is performed by the tensioning of cable 75 by pulley 48. The dimensions of cables 70 and 75 and members 71 and 72 are determined by the deployed geometry of segments 33 and 34 and the respective pulleys 30 and 48.

The embodiment for wing 19 deployment in FIG. 8 shows a single brace member 80 which at its inboard end is slidable in a slide 81 longitudinally attached to the outside of the tube 15 and at the other end is pivoted from a fitting 82 intermediate the ends and on the aft side of segment 33. A pulley 83 is mounted proximate the inboard end on member 80. A cable 84 is routed from the aft end of tube 27 over pulley 30 and over the aft side of pulley 80 to the forward side of pulley 48 and then the leading edge of segment 34, where it is attached. The stroke of damper tube 27 governs the displacement of pulley 83 and the length of member 80, displaced at its inboard end along side 47 by the displacement of pulley 83, is determined by the deployment of segment 33. The length of cable 84 is determined by its course with segments 33 and 34 fully deployed. The tensioning of cable 84 over pulleys 83 and 84 results both in the deployment of segment 34 and the sliding forward of the inboard end of member 80 to deploy segment 33.

Another embodiment for controlling the aerodynamic surfaces is shown in FIGS. 9 and 10 typically illustrating a section of left wing 19 only. All of the controls are operated on the principle of altering the local air foil by ram air to selectively inflate bladders 90 inside the deployed coverings 19 as shown and 22a and 23a not shown. The pressure inside bladder 90 is generated by the combination of opening of a valve 92, mounted on the aft side of segment 34, according to control output in conductor 40, with the leakage through orifice 95. Valve 92 drops the ram pressure entering through inlet 93, ducted to the bladders 90 by a flexible manifold 91, according to the leakage rates thereby stretching the covering 19a and altering the air foil.

Some of the many advantages and improvements over the prior art should now be apparent. The described invention addresses an immediate problem, recognizing the many limitations imposed on the solution, in a way that is compatible with presently used airplanes. Enumerating some of the limitations, like, for example, reduction of the deployment shock, stabilization of a high aspect ratio wing in deployed flight and the control over the wing deployment transient, as well as convenient and basic flight control approach, it is apparent from the description that all of the above are accommodated in the invention. For example, the inclusion of a damper unit serves to satisfy both the function of reducing the transient of chute deployment and the sequence control between the deployment of the empennage and the wing. Also the deployment of an empennage allows for the utilization of slender wings without the associated problem of longitudinal stability margins and at the same time allows for control over the area presented to air flow during wing deployment. Accordingly it is now apparent that the described invention provides a back-up system which is compatible with existing crew compartments as well as being compatible with the restrictions in load environment on the ejecting crew member, and at the same time provides the desired range increment and the platform for engine attachment.

Obviously many modifications and variations of the present invention are possible in the light of the above teachings. It is therefore to be understood that in the scope of the appended claims the invention may be practiced otherwise than as specifically described.

What is claimed is:

1. An aircrew recovery system ejectable from an aircraft for deployment into a fixed-wing type aerodynamic vehicle and for emergency descent comprising, in combination:

a rigid aircraft ejection seat structure having a back portion;
   a telescoping boom means attached at the one end thereof to the back portion of said ejection seat structure and extendable to form a fuselage;
   collapsible wing means operatively connected between the distal ends of said boom means for laterally deploying fixed-wing type airfoil shifting and control surfaces therein from either side of said boom means upon extension thereof;
   collapsible tail means operatively connected to the other end of said boom means for laterally and vertically deploying stabilizing and control surfaces therein upon extension of said boom means;
   damper means operatively connected between the distal ends of said boom means for selectively limiting the respective deployment rates of said boom, wing and tail means; and
   force-inducing means operatively connected to said damper means and said boom means for applying a deployment force thereto.

2. An aircrew recovery system according to claim 1 further comprising:

said damper means including first and second elements respectively attached to the distal ends of said boom means, an intermediate third element viscously slidable relative to said first and second elements, and a fitting formed on the distal end of said second element connected to said force-inducing means.

3. An aircrew recovery system according to claim 2 further comprising:

said boom means including an outside tube pivotally attached to one end to the back of said seat, and an innermost tube having longitudinally slots at spaced intervals around the circumference thereof; and
   said tail means including leading edge members pivotally attached at one end to said innermost tube within respective ones of said slots, strut means operatively connected between said second element of said damper means and said edge members, trailing edge tail wires connected between the other ends of said edge members and said innermost tube, and flexible coverings attached between said edge members and tail wires forming thereby said stabilizing and control surfaces.

4. An aircrew recovery system according to claim 3 further comprising:

said wing means including opposed inboard leading edge segments pivotally connected at respective one ends to said outside tube near the one end thereof, first linkage means operatively connected between the other ends of said inboard segments and said outside tube near the other end thereof, second linkage means operatively connected between said first linkage means and said third element, opposed outboard leading edge segments pivotally connected at respective one ends to the other ends of said inboard segments and having wing tips formed at the respective other ends thereof, trailing edge wing wires connected between the trailing end of said wing tips and said outside tube near the other end thereof, third linkage means operatively connected between said outside tube and said outboard segments and between said inboard segments and said outboard segments for simultaneous deployment of said segments, and flexible coverings attached between said segments and wing wires forming thereby said lifting and control surfaces.

5. An aircrew recovery system according to claim 4 further comprising:

said wing tips each including a pivot intermediate the ends thereof, and lift actuator means operatively connected to said pivot for deflecting the trailing wing edge;
   said innermost tube including a plurality of pivots intermediate the ends thereof, and stabilizer actuator means operatively connected to said pivots for deflecting the trailing tail edge; and
   control means operatively connected between said seat and said lift and stabilizer actuator means for providing aircraft control, 6. An aircrew recovery system according to claim 4 further comprising:

bladders contained within said flexible coverings for deforming said surfaces in accordance with air pressure therein, each of said bladders having an opening for receiving ram air, a control valve in said opening, and a fixed orifice; and
   control means operatively connected between said seat and each of said valves for providing aircraft control.

7. An aircrew recovery system according to claim 3 further comprising:

said wing means including opposed inboard leading edge segments pivotally connected at respective one ends to said outside tube near one end thereof, brace members pivotally attached at respective one ends to said inboard segments intermediate their ends and slidably connected at respective other ends to said outside tube, first pulleys attached to opposite sides of said outside tube near said one end, second pulleys attached to respective ones of said brace members near the other ends thereof, outboard leading edge segments pivotally connected at respective one ends to the other ends of said inboard segments and having wing tips formed at the respective other ends thereof, trailing edge wing wires connected between the trailing ends of said wing tips and said outside tube near the other end thereof, cables operatively connected between said third element of said damper means and respective ones of said outboard segments and routed over the forward side of said first pulley and the aft side of said second pulley for simultaneous deployment of said segments, and flexible coverings attached between said segments and wing wires forming thereby said lifting and control surfaces.

8. An aircrew recovery system according to claim 7 further comprising:

said wing tips each including a pivot intermediate the ends thereof, and lift actuator means operatively connected to said pivot for deflecting the trailing wing edge;

said innermost tube including a plurality of pivots intermediate the ends thereof, and stabilizer actuator means operatively connected to said pivots for deflecting the trailing tail edge; and control means operatively connected between said seat and said lift and stabilizer actuator means for providing aircraft control.

9. An aircrew recovery system according to claim 7 further comprising:

bladders contained within said flexible coverings for deforming said surfaces in accordance with air pressure therein, each of said bladders having an opening for receiving ram air, a control valve in said opening, and a fixed orifice; and control means operatively connected between said seat and each of said valves for providing aircraft control.

10. A collapsible fixed-wing type aircraft comprising, in combination:

a rigid seat structure having a back portion;

a telescoping boom attached at the one end thereof to the back portion of said seat and extendable to form a fuselage;

a collapsible fixed-wing type airfoil assembly having wing and tail members with lift and control surfaces, said assembly operatively connected between the distal ends of said boom for deploying transversely of said boom upon extension thereof; and force means operatively connected to said boom for applying a deployment force thereto.

11. A collapsible aircraft according to claim 10 further comprising:

said left and control surfaces including an inboard leading edge segment pivotally connected at end end to said boom near the one end thereof, first linkage means operatively connected between the other end of said inboard segment and said boom intermediate the ends thereof, second linkage means operatively connected between said first linkage means and said boom, an opposed outboard leading edge segment pivotally connected at one end to the other end of said inboard segment and having wing tip formed at the other end thereof, a trailing edge wing wire connected between the trailing end of said wing tip and said boom near the other end thereof, third linkage means operatively connected between said boom and said outboard segment and between said inboard segment and said outboard segment for simultaneous deployment of said segments, and flexible coverings attached between said segments and wing wire forming thereby lifting and control surfaces.

12. A collapsible aircraft according to claim 11 further comprising:

said boom including a longitudinal slot; and a stabilizer including a leading edge member pivotally attached at one end to said boom within said slot, a strut operatively connected between said boom and said edge member, a trailing edge stabilizer wire connected between the other end of said edge member and said boom, and a flexible covering attached between said edge member and tail wire forming thereby stabilizing and control surfaces.

13. A collapsible aircraft according to claim 12 further comprising:

control means operatively connected between said seat and said control surfaces for controlling the aircraft flight.

14. A collapsible aircraft according to claim 3 further comprising:

said control surface including an inboard leading edge segment pivotally connected at one end of said boom near one end thereof, a brace member pivotally attached at one end to said inboard segment intermediate the ends thereof and slidably connected at the other end to said boom, a first pulley attached to said boom near said one end, a second pulley attached to one end of said brace member near the other end thereof, an outboard leading edge segment pivotally connected at one end to the other end of said inboard segment and having a wing tip formed at the other end thereof, a trailing edge wing wire connected between the trailing end of said wing tip and said boom near the other end thereof, a cable operatively connected between said boom and said outboard segment and routed over the forward side of said first pulley and the aft side of said second pulley for simultaneous deployment of said segments, and flexible coverings attached between said segments and wing wire forming thereby a lifting and control surface.

15. A collapsible aircraft according to claim 14 further comprising:

said boom including a longitudinal slot; and a stabilizer including a leading edge member pivotally attached at one end to said boom within said slot, strut means operatively connected between said boom and said edge member, trailing edge tail wire connected between the other end of said edge member and said boom, and a flexible covering attached between said edge member and tail wire forming thereby a stabilizing and control surface.

16. A collapsible aircraft according to claim 15 further comprising:

control means operatively connected between said seat and said control surfaces for controlling the aircraft flight.

* * * * *